Patented Apr. 16, 1929.

1,709,135

UNITED STATES PATENT OFFICE.

RICHARD L. LLOYD, OF NEW YORK, N. Y., ASSIGNOR TO DWIGHT & LLOYD METALLURGICAL COMPANY, OF NEW YORK, N. Y., A CORPORATION OF NEW JERSEY.

APPARATUS FOR AND PROCESS OF SMELTING ZINC ORES.

No Drawing.   Application filed November 2, 1926.   Serial No. 145,916.

This invention relates to a process for recovering zinc from ores by a smeltery method known as retorting, and more particularly it relates to a process of making condensers and other containers and receptacles employed in the smelting of zinc ores whereby the smelting may be more efficiently carried out and the percentage of recovery may be increased.

The invention further relates to a new type of condenser, container or other receptacles adapted to receive volatilized zinc and zinc products from the retorts or to contain ore itself which will permit economical recovery of zinc which is absorbed thereby.

The invention further consists in the method of smelting zinc ores whereby the loss of zinc due to absorption by the condensers or other containers may be minimized, and whereby the zinc so absorbed may be effectively and economically recovered.

The invention still further relates to a tile for use in zinc smelting.

The invention also consists in the new and novel features of operation and the new and original arrangements and combinations of steps in the process hereinafter described and more particularly set forth in the claims.

In practicing my improved process, zinc bearing material, such as may be used for the charge in a zinc retort, is mixed with a suitable binder to form a mass of the desired consistency. The tile, condenser or other container is then formed of this material or formed of another refractory such as clay and lined with this material. During the smelting operation a percentage of the zinc or its compounds will be absorbed by the condenser or other container, and is added to the zinc initially present in the zinc bearing material forming the body of the receptacle or forming the lining thereof. This absorbed zinc is allowed to accumulate until the container is to be discarded. The container is then removed from the furnace and broken up into particles of suitable size which may be added to a charge of ore to be treated, whereby the absorbed zinc, together with the zinc originally present in the material, may be recovered without additional treatment or expense.

More specifically in making tiles, condensers or other containers in accordance with the present invention, a mixture is first made consisting mainly of zinc bearing material and a suitable binder. For example, oxidized zinc ores, flue dust or roasted zinc ore may be moistened with a solution of sulphuric acid, and the oxysulphate formed will bind the whole into a strong solid material, which may then be baked or otherwise treated to make a strong refractory article such as a tile, container or condenser. As a further illustration a mixture of oxidized zinc compounds and zinc sulphide in suitable proportions may be used. If desired the mixture may be moistened with water and such material as water glass, plastic clay, sulphuric acid, zinc sulphate or other non-reducing binding agent or combination of agents to bind the zinc bearing material together, and which may be afterwards heat treated.

The mixture may then be moulded into the desired form and dried slowly to avoid cracking. It may then be baked by application of a suitable heat until the required refractory condition is reached.

Condensers made by this method may be used in the regular way in zinc practice. When they break or weaken or for other reasons require replacement, the discarded condenser is broken up into small particles, roasted if necessary to remove sulphur, and mixed with the regular ore charge. By this method the zinc in the condenser, both that in the material originally used and that absorbed from the ore charges during the period in which the apparatus has been in use, may be recovered economically and without the expensive operation and unavoidable losses in concentration now practiced on these appliances.

If desired the condenser may be made of the usual clay mixture, but with an internal lining of material in which zinc predominates, such as the mixture of zinc oxide and zinc sulphate or the other mixtures hereinbefore described. The article may be used in the usual manner until replacement is required when the zinc may be recovered by breaking off and discarding the outer clay refractory shell. The zinc bearing lining is then crushed and mixed into the ore charge as above described. The zinc bearing lining may be formed in the shell before the clay shell is baked, and the two baked in one operation, or it may be formed in the clay shell after this has been baked, and may then be baked or otherwise treated as a second operation.

By my improved process the "absorbed" zinc or zinc which remains in or attached to the walls of the receptacle may be saved. The process further makes possible the manufacture of refractory condensers and retorts of excellent quality for carrying on the regular smelting operation. Retorts made by this process are resistant to softening or sagging when used in the furnace, are not greatly attacked by the slag of the ore charge, and consequently have a comparatively long life, so that the expense of renewal is low. The condensers and/or retorts are strong, resistant to breakage and conduct heat to a degree such that the distilled zinc is readily and quickly cooled and liquefied, in the case of the condenser, and heat quickly conducted to the charge in the case of the retort.

It will be apparent that by this process refractory articles such as retorts and condensers for use in smelting zinc ores may be produced of sufficient density and hardness, resistance to oftening and chemical changes under heat, and strength to withstand mechanical strains. Such retorts and condensers permit the economical recovery of the absorbed zinc, hitherto largely wasted or recovered in part only and at considerable expense. They are by this method manufactured from material already available at zinc smelters, and at little or no more expense for manufacture than the clay refractories now in use and at no extra expense for original materials. In consequence, large savings in the cost of smelting zinc ores by the retort method are made possible.

Tile formed of this zinc bearing material may be used wherever zinc fumes are to be encountered.

Although certain novel features of the invention have been shown and described and have been pointed out in the annexed claims, it will be understood that various omissions, substitutions and changes in the several steps of the process and in its operation may be made by those skilled in the art without departing from the spirit of the invention. The invention has been described as applied to condensers for use in zinc refining, however, it is applicable to retorts and other refractory articles and may be applied to other treating processes by constructing the article of suitable material.

What is claimed is:

1. A receptacle of the class described for use in smelting zinc ores composed of a mixture of oxidized zinc compounds with a limited proportion of a zinc salt constituting binding agent therefor.

2. A receptacle for use in smelting zinc ores composed pricipally of zinc oxide, bonded with a sulphate of zinc.

3. A receptacle of the class described for use in smelting zinc ores composed of an outer shell of refractory clay material and an inner lining of zinc bearing material; said lining being capable of separation from said shell.

4. The process of manufacturing refractory receptacles for use in smelting zinc ores which consists in mixing particles of oxidized zinc bearing material with a chemical reagent capable of forming a zinc salt with said zinc bearing material, working the mixture until substantially uniformly plastic, forming the mixture into an article, drying the formed article and further heating it to convert the mixture into a refractory material suitable for use in smelting operations.

5. The process of manufacturing refractory receptacles for use in smelting zinc ores which consists in mixing roasted zinc ore in the form of grains with zinc sulphide, moistening the mixture with a non-reducing agent capable of forming with the zinc bearing material a zinc salt having binding properties, working the mixture until substantially uniformly plastic, forming the mixture into the desired shape, then heating the formed article to convert it into a firm, dense, refractory material suitable for use in smelting operations.

6. The process of manufacturing refractory receptacles for use in smelting zinc ores which consists in forming a mixture of plastic clay and grog into a shell of the desired shape, then forming within the shell a lining of a material composed mainly of zinc compounds, drying the formed article and treating it to convert said materials into a refractory condition.

7. The process of manufacturing refractory receptacles for use in smelting zinc ores which consists in forming within a refractory clay container, a lining composed of a material containing substantial proportions of zinc, then drying and burning the article to convert the lining into a resistant refractory state.

8. A retort for use in smelting metallic ores, comprising a lining in which the metal predominates in combination with a binder formed of a salt of said metal, said lining being treated to form a refractory substance.

9. The process of forming a refractory material for use in the manufacture of zinc, which comprises treating roasted zinc ore with sulphuric acid to produce a small proportion of a sulphate of zinc capable of serving as a binder, forming the material into an article, applying an exterior coating of clay thereto and baking to produce a refractory material having a separable inner lining formed principally of zinc.

In testimony whereof I have hereunto set my hand.

R. L. LLOYD.